July 23, 1968
T. R. SIMMONS
3,393,564
SIGHT LEVEL GAUGE CLEARING APPARATUS
Filed Nov. 2, 1966
3 Sheets-Sheet 1
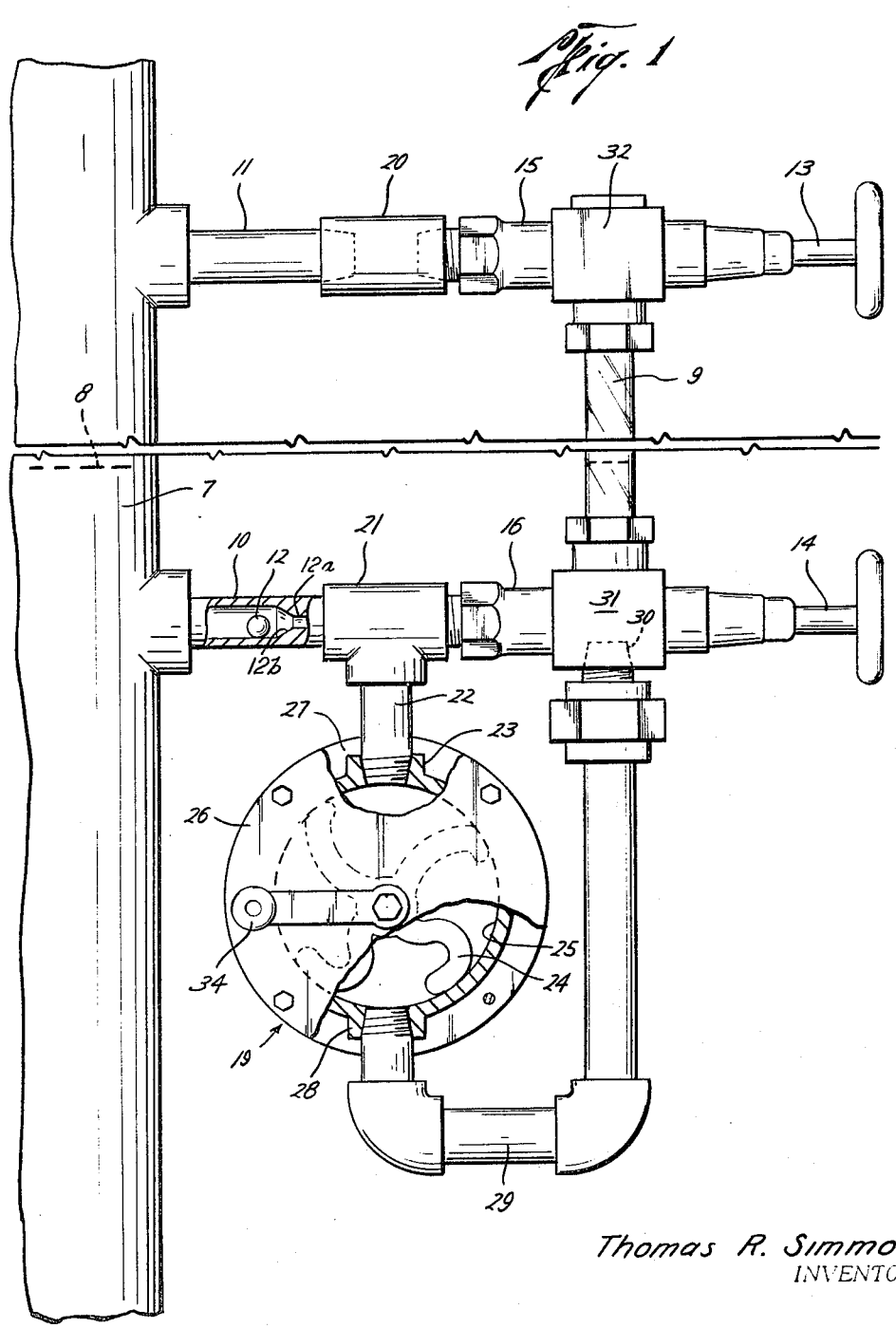
Thomas R. Simmons
INVENTOR.
BY Bertram H Mann
ATTORNEY

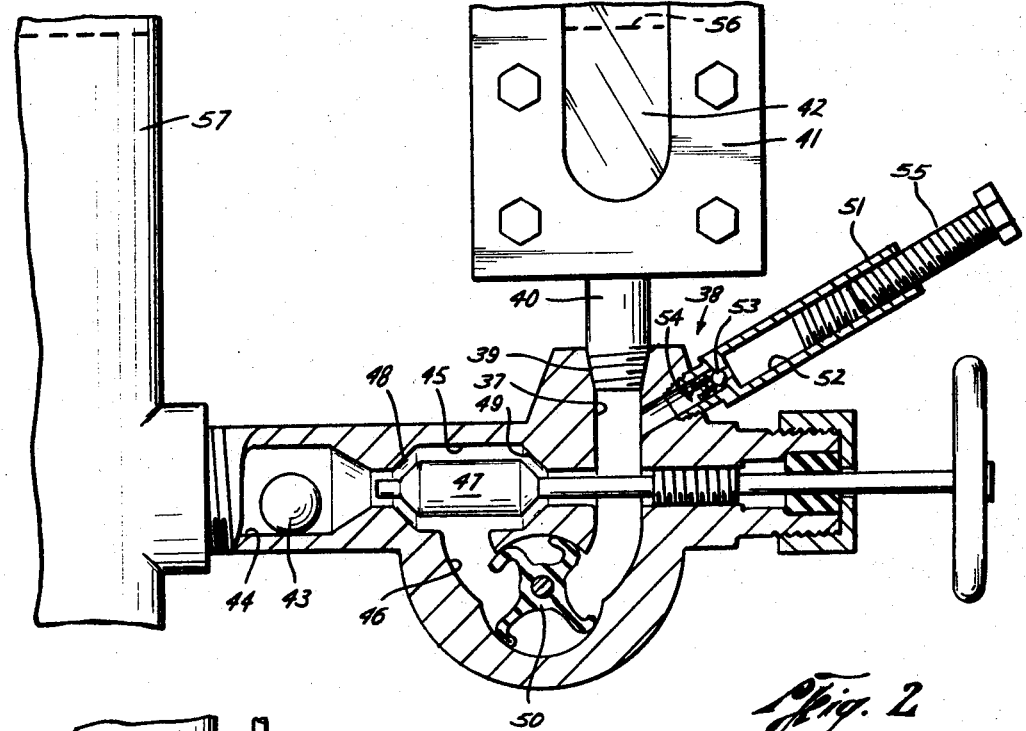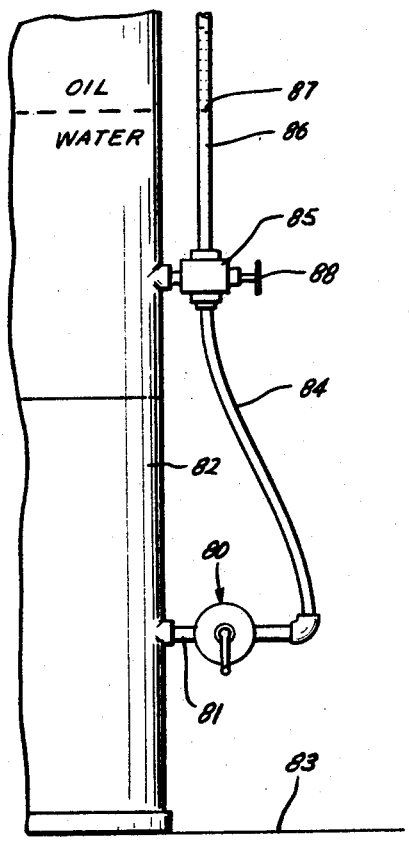

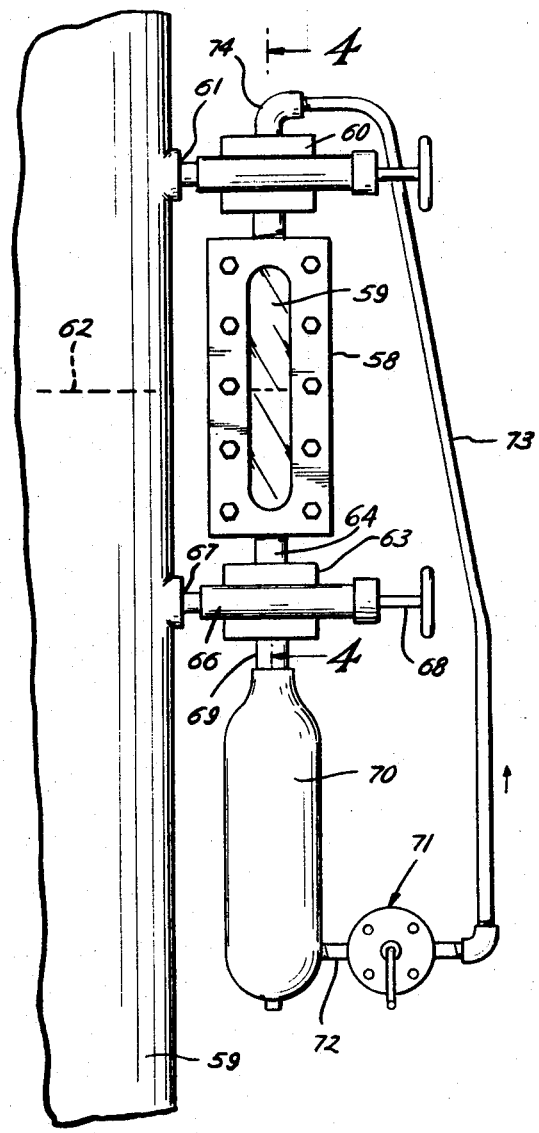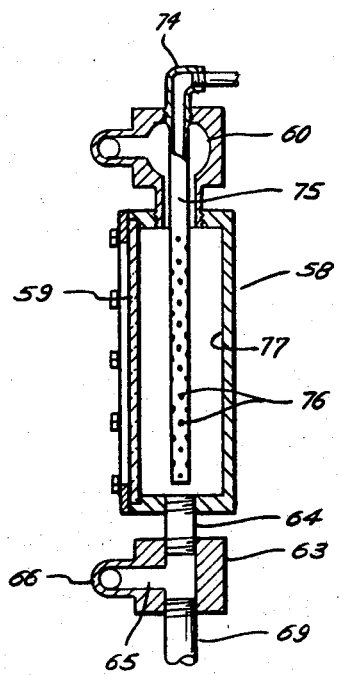

United States Patent Office 3,393,564
Patented July 23, 1968

3,393,564
SIGHT LEVEL GAUGE CLEARING APPARATUS
Thomas R. Simmons, Dickinson, Tex., assignor of one-half to William H. Simmons, Houston, Tex.
Filed Nov. 2, 1966, Ser. No. 591,473
8 Claims. (Cl. 73—324)

ABSTRACT OF THE DISCLOSURE

In order to clear the often stained glass of a sight level gauge mounted on a tank, a small hand or otherwise powered pump is provided in a bypass connected to the gauge for forcing a flow of liquid either from the tank itself or from a separate source through the gauge glass in either direction.

---

This invention relates to liquid level sight gauges and consists particularly in novel means for clearing the transparent walls and tubular connections of such gauges for more accurate reading thereof.

The level registering sight glass tubes usually provided on tanks for oil and other fluids, which are likely to discolor the transparent tube wall, frequently are so obscured by such discoloration as to make the reading of the tank level difficult or impossible. Furthermore, the connections between the sight gauge tube and the tank may become clogged so that an inaccurate registry is given. In some cases it is very important that a liquid level within a certain level be maintained. For instance, in treating tanks for petroleum containing water it is essential that the interface between the petroleum and the settled water remain above the water drainage ports and below the oil discharge ports. Heretofore, in order to check a sight glass indication of the interface, particularly where the glass is obscured, it has been customary to open a cock at the bottom of the glass for "blowing the glass" by means of the tank pressure. However, this procedure often is very undesirable since it opens the tank system and spills stored liquids on the nearby ground or floor. Besides being messy, the stored liquids, if volatile, create a definite hazard. Other means provided for the same purpose include scrapers of various types and means for connecting a separate pressuring source into the gauge glass circuit.

Accordingly, an object of the present invention is to provide means which is enclosed in the gauge glass circuit for causing circulation of a wash fluid, either the fluid in the gauged tank or a special fluid, through the gauge glass, for preventing discoloration thereof and for removing material adhering thereto.

Another object is to provide a pump device in closed circuit with the gauge glass and which may be easily actuated by a workman each time he inspects the gauge glass so as to be sure of accurately reading the desired level.

Still another object is to provide an auxiliary pumping system for clearing gauge glasses which can be either built in with the original gauge glass installation or easily connected into the gauge glass circuits with which storage tanks are equipped.

Still another object is to provide a combination accessory pump and receptacle for washing fluid which can be conveniently connected to the gauge glass circuit.

These objects and others hereafter appearing are attained substantially by my herein-described invention which consists in general of a small hand pump, conveniently a flexible vane type of pump, which is connected in a bypass around the gauge glass or from the tank itself to one end of the gauge glass. The pump is provided with a conveniently located, hand-operating crank so that each time the gauge glass is to be inspected, the pump can be operated briefly to clear the glass or tube connections. Both the pump and gauge circuits remain closed so that at no time is there any "blowing" into the atmosphere or onto the floor or ground as heretofore.

In the accompanying drawings which illustrate the invention,

FIG. 1 is an elevation, partly sectioned, illustrating one form of the invention;

FIG. 2 is a similar view illustrating another form of the invention;

FIG. 3 is a similar view illustrating another form of the invention;

FIG. 4 is a detail section taken on line 4—4 of FIG. 3; and

FIG. 5 is an elevational view showing a portion of an oil emulsion treating tank with still another form of the invention applied thereto.

FIG. 1 shows a tank 7, such as a pressure vessel, in which the normal liquid level is indicated at 8. A sight level gauge glass tube 9 extends vertically along the tank wall in the usual manner and is connected by means of nipples 10 and 11 to the tank below and above level 8. Nipple 10 is provided with a safety check ball 12 which seats against a restriction 12a when the outward velocity of fluid in nipple 10 increases excessively, as in case of breakage of tube 9. Ball valve 12 normally rests clear of seating restriction 12a, being biased toward its open position, as shown, by the inclined wall 12b. Valves 13 and 14 provide for manual closing of valve seat fittings 15 and 16 when it is desired to isolate tube 9.

In order to accommodate the pump 19, which constitutes an important port of the present invention, sight glass fittings 15 and 16 are shifted outwardly by the interposition of couplings 20 and 21 between the same and nipples 11 and 10. Coupling 21 is a T-coupling and its bottom opening is connected by a nipple 22 to the inlet coupling 23 of pump 19, which, in the present instance and advantageously, is a flexible vane type of rotary pump. The pump includes a four-vane impeller 24 which is pivoted slightly eccentrically within the circular casing 25 and within the working chamber completed by circular front and back plates 26 and 27.

Outlet fitting 28 of the pump is connected by piping 29 to a threaded opening 30 provided in the bottom of base gauge coupling body 31. Threaded opening 30 normally receives a pet cock which can be used to drain or "blow" the gauge glass system. Glass tube 9 is connected between base and top body fittings 31 and 32. Pump 19 and its connections 22 and 29 and lower gauge connections 10, 21, 16, 31, conveniently, are parallel having common connections (10 and 31) to the tank and gauge.

When a workman desires to check the position of liquid level 8, whether it be at the top of the body of liquid in the tank or an interface between stored liquids of different gravities, he will first close valve 14 and then actuate pump 19 by turning crank 34 several times so as to cause a rush of the heavier fluid in the tank past ball 12, thence through piping 29 and tube 9. The fluid will be caused to move along in intimate contact with the inner wall of tube 9 to clear the same. The pressure produced by pump 19 will be insufficient to seat ball 12 due to the weight thereof. The pumped liquid will return to the tank through piping elements 15, 20, and 11. Upon reversal of the pumping action and closure of valve 13 and opening of valve 14, nipple 16 can be washed. At the end of these pumping operations, the liquid in the glass tube will be allowed to settle and then the level in the tube can be read with assurance that it accurately reflects the liquid level 8. This form is particularly adapted for application as an accessory to an already-installed sight glass system.

FIG. 2 shows an accessory pumping system which functions, in general, similarly to that in FIG. 1 and which can be incorporated as the unit with the bottom glass mount body 38, as when the sight glass is originally installed. Threaded opening 39 at the upper end of passage 37 in body 38 receives a nipple 40 at the bottom of sight glass member 41 having a transparent window 42. Safety ball 43 is received in a chamber 44 in the leftward arm of body 38 which is connected to passage 37 through branched passages 45 and 46. First branch passage 45 is somewhat enlarged to receive a double-seating valve 47 which has seats 48 and 49 in body 38. Second branch passage 46 forms the chamber for flexible vane pumping impeller 50 having an operating handle (not shown) projecting sidewardly from the pump body. An internally-threaded sleeve 51 forms a chamber 52 for receiving a suitable cleaning material such as a soap, emulsion breaker, or stain remover. Chamber 52 communicates past a normally seated outlet check ball 53 with an angled passage 54 in body 38 which communicates with passage 37 therein. A plunger 55 may be screwed or otherwise forced into sleeve 51 to expel material from chamber 52.

If it is desired to verify, stabilize, and clarify liquid level 56 corresponding to the liquid level in the tank 57, valve 47 will be moved against its right-hand seat 49. Thereupon, impeller 50 will be rotated in the direction for drawing liquid from the tank through chamber 44 and lower parallel passage 46 of the pump and discharging the same upwardly through the sight glass so as to intimately contact and wash transparent wall 42. If desired, a charge of washing material may be provided in chamber 52 and threaded plunger 55 may be turned to discharge the material into the fluid being circulated through the sight glass tube. Seat 48 may be closed by valve 47 for taking the unit out of service.

FIGS. 3 and 4 show a form of the invention useful where it is desirable to use a wash liquid other than the fluid stored in the tank to clear the sight glass wall. The sight glass device 58 having transparent wall 59 has a top coupling body 60 connected to a threaded orifice 61 in the tank wall above normal level 62. Bottom coupling body 63 connects by means of nipple 64 with the bottom of the sight glass device and has a side opening 65 leading into the side of a connector pipe 66 which connects with a tank fitting 67 beneath normal level 62. A valve 68 is provided in pipe 66.

Projecting from the bottom of coupling body 63 is a nipple 69 which connects the same with the upper end of a small receptacle 70 for containing a suitable washing fluid. Pump 71, conveniently of the same type as shown in FIG. 1, is connected to a pipe 72 leading from the bottom of receptacle 70, and its outlet is connected through piping 73 to a fitting 74 at the top of upper coupling body 60. A nozzle 75 depends from fitting 74 centrally through and spaced from the wall of upper coupling body 60 and down into and substantially through chamber 77. The portion of nozzle 75 within chamber 77 is perforated, as at 76, for directing the wash fluid in jets against the chamber wall, particularly transparent wall 59 thereof.

In operation, rotation of the pump handle will draw wash liquid from tank 70 and force it through nozzle perforations 76 against the inside of sight wall 59 for washing the same. The wash liquid preferably will be heavier than the liquid stored in the tank and, because of the direct downward connection in body 63 between aligned nipples 64 and 69, this liquid will tend to return directly to tank 70 bypassing tank connection 65, 66 which is disaligned with respect to nipples 64 and 69.

On the other hand, the stored liquid in tank 59, being lighter than the washing liquid, will remain on top of this body of washing liquid. Thus, the washing liquid will not enter the tank and the level indicated in sight glass 59 will accurately reflect the level 62 in the tank.

The form in FIG. 5 is particularly adapted for use with a tank which sits on the ground or is equipped with a walkway which is so far below the level to be gauged as not to be conveniently reached by the workman, although he may view the sight gauge. Here, the small hand pump 80 is connected by means of nipple 81 to the tank 82 in easy reach of a man standing on the ground or walkway 83. The outlet of the pump is connected by a long section of tubing 84 to the bottom of lower sight glass body 85, which corresponds to the body 31 in FIG. 1. Sight glass 86 projects above body 85 so as to properly reflect the interface 87 between the water and oil layers in the tank. With valve 88, preferably, in its closed position, the inspecting workman turns the handle of pump 80 a few times in order to force clear water from fluid supply, in this case, the bottom of the tank, upwardly through gauge glass 86. This will have the effect of clarifying the glass, particularly at the interface level 80, so that, after the level 87 in the tube settles, the inspector can be reasonably certain that it properly reflects the interface within the tank itself.

Various kinds of pumping arrangements can be used, and the system may be used with advantage in any case where a level-measuring sight glass becomes obscure because of staining or where the level may be inaccurately reflected because of blockage. If the inspector operates the pump each time he views the sight glass, usually at least daily, a hardened, discolored crust or film can be prevented from forming on the glass. Also, various types of sight gauges may be used having transparent viewing walls as parts of tubes or otherwise. The invention may be modified in various respects as will occur to those skilled in the art, and the exclusive use of all modifications as come within the scope of the appended claims is contemplated.

I claim:

1. The combination with a level sight gauge and fluid supply tank means, said gauge having a viewing wall of transparent material, at least two parallel ducts connecting said supply tank means and said gauge, a pump interposed in one of said ducts, and an actuator for said pump for forcefully moving fluid from said supply means along and in intimate contact with said wall in a manner to wash said wall and thereby improve the transparency thereof.

2. The combination described in claim 1 in which said fluid supply includes a tank charged with immiscible fluids with an interface, said gauge having connections to said tank for directing tank fluid into said gauge to thereby visibly indicate on said wall the level of said interface, and said pump having a connection to a portion of said tank at one side of said interface for forcing one of said immiscible fluids along said wall as a wash.

3. The combination described in claim 2 in which said fluids are oil and water and said pump connection extends to said tank below said interface for forcing the heavier fluid in said tank through said gauge as a wash.

4. The combination described in claim 2 further including valve means for closing said connection between said gauge and said tank to improve the efficiency of said pump.

5. The combination described in claim 2 further including an access fitting in the connection between said gauge and said pump for introduction of washing material into said pump.

6. The combination described in claim 1 further including restricted nozzle means in said gauge for causing jetting of wash fluid from said supply means by said pump against the wall of gauge.

7. The combination described in claim 1 in which said gauge has connections at its opposite ends for connection to a fluid tank, said pump having separate connections to said opposite ends of said gauge, and further including a receptacle for cleaning fluid included in said separate connections.

8. The combination described in claim 7 in which said receptacle and said tank have a common connection to said gauge, there being a substantially straight line connection between said gauge and said receptacle and said common connection diverging at an angle from said straight line connection whereby fluid passing from said gauge through said straight line connection tends to flow directly into said receptacle rather than into said tank.

References Cited

UNITED STATES PATENTS

| | | | |
|---|---|---|---|
| 1,992,425 | 2/1935 | Hatchel | 73—324 |
| 1,990,709 | 2/1935 | Rhodes et al. | 122—379 |
| 2,259,644 | 10/1941 | Kling | 122—379 X |
| 3,194,216 | 7/1965 | Grabowski | 122—379 |
| 3,200,644 | 8/1965 | Brous | 73—324 X |
| 2,648,857 | 8/1953 | Kelly et al. | 73—324 X |

S. CLEMENT SWISHER, *Acting Primary Examiner.*

D. M. YASICH, *Assistant Examiner.*